Oct. 16, 1951 J. W. McDEVITT 2,571,465
ADJUSTABLE CAKE CUTTER
Filed Nov. 7, 1947

John W. McDevitt
Inventor
By Bush & Bush
His Attorneys.

Patented Oct. 16, 1951

2,571,465

UNITED STATES PATENT OFFICE 2,571,465

ADJUSTABLE CAKE CUTTER

John W. McDevitt, Davenport, Iowa

Application November 7, 1947, Serial No. 784,728

4 Claims. (Cl. 30—114)

My invention relates to cake cutters having a spatula-like plate rigidly united to a handle and a V-shaped cutting element arranged to lift into vertical position for the insertion of the plate or spatula and to be turned down to a horizontal position to cut a V-shaped slice of cake, pudding, pie, or similar articles.

The objects of my invention are to provide a cake cutter in which the spatula or plate will support the cake and the cutting element will hold the cut slice in position upon the spatula to be carried to any desired point; to provide means by which the size of the cut can be readily varied; to provide means by which the cutter can be readily held in retracted position by the force of gravity. Other objects will appear in the description.

I accomplish these objects by the means illustrated in the accompanying drawings, in which—

Figures 1, 2, 3, 4:
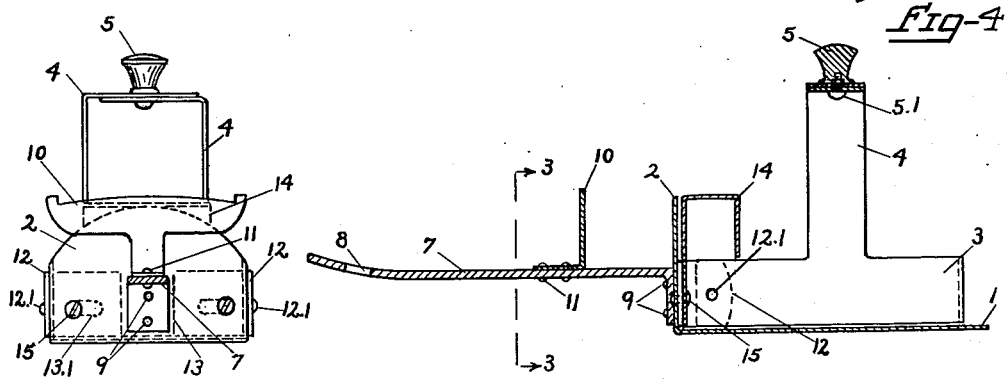
Figure 1 is a plan view of my cutter.
Figure 2 is a sectional elevation of my cutter on the line 2—2 of Figure 1.
Figure 3 is a sectional elevation on the line 3—3 of Figure 2.
Figure 4 is an alternate detail showing the blades 3—3 united at the front end.

My appliance comprises a flat substantially triangular plate 1 with the rear end thereof turned up at right angles to the plate 1 to form a back, and a handle 7 rigidly united to the back 2 by rivets 9 or other suitable means.

A pair of blades 3—3 arranged in V-shape form, conforming substantially to the shape of the plate 1, are pivotally united to the front arms or wings of angle members 12—12 and are movable upon pivot pins 12.1—12.1 to be raised into vertical position to permit free insertion of the plate 1 under the cake after which the cutting blades 3 may be swung on the pivots 12.1 into horizontal position as shown in Figures 1 and 2 while cutting the cake.

The blades 3—3 may be united at their front ends as in Figure 4, or held in close juxtaposition by the arms 4 as in Figure 1.

Vertical arms 4 are united to the blades 3—3 preferably near the middle thereof and extend upwardly with crossbars at their upper ends which may be united by the knob 5 and screw 5.1, passing through the slot 6.

A rest 10 is united to the handle by rivets 11 or other suitable means, and extends transversely thereof upon which the arms 4 may rest when the blades 3—3 are placed in perpendicular position to the plate 1.

Attached to the back 2 is a stop 14 to contact the cake and limit the maximum distance to which the plate 1 may be inserted under the cake.

The angle members 12—12 are formed of thin plates and have inwardly extending lateral extensions or wings 13—13 formed integral therewith. The lateral extensions are provided with slots 13.1—13.1 and may be secured to the back 2 by bolts or set screws 15—15 arranged to permit the lateral wings 13—13 to slide laterally upon the bolts 15—15 so as to widen or narrow the slices to be cut.

The handle may be provided with an opening 8 by which it may be conveniently hung up.

In cake cutters heretofore in use, no suitable provision has been made for a rest to hold the cutting blade in position by gravity nor for adjusting the cutting blade to cut wider or narrower slices, nor to avoid the resistance caused by having the blades rigidly united at the point of the V.

In the operation of my appliance, the blades 3—3 are turned into vertical position with the arms 4 resting upon the rest 10. The plate or spatula 1 is then inserted between the cake and the support holding it, toward the center of the cake until stopped by the cake coming in contact with the stop 14. By the use of the knob 5, the cutting blades 3—3 are then swung upon pivots 12.1—12.1 into the horizontal position shown in Figure 2 until the cutting edge of the blades reaches the plate 1. The cutter may then be withdrawn by the handle 7 carrying with it the slice of cake which has just been cut and the slice may be carried to any of the persons being served without danger of the slice tipping over and without dropping crumbs.

The cutting blades 3—3 may be of any desired height and of sufficient width to hold the blades securely whether the blades are separate or united at the point. Where the cakes are thicker than the height of the cutting blades 3—3, the arms 4 will serve to hold the upper portions of the slice in position.

With this form of cutter the cutting blades 3—3 can be made quite narrow and the arms 4 may be widened as needed.

I prefer to form the arms 4 integral with the cutting blades 3—3 and of stainless steel, while the remainder of the appliance is preferably of sheet aluminum or other suitable metal excepting the handle, which may be cast or otherwise formed as desired.

It is obvious that variations may be made in the size and proportions of the different parts, as well as the materials of which they are composed without departing from the spirit of my invention and I do not limit my claims to the precise forms or materials described.

I claim:

1. A cake cutter comprising a triangular plate with upturned back formed integral therewith and a handle rigidly united to the back, angle members having wings parallel to and united to the back at opposite ends thereof, cutting blades arranged in V-shape pivotally united to forwardly extending wings of the angle members and extending forwardly therefrom respectively, upwardly extending arms united to the opposite cutting blades, and a rest carried by the handle arranged to support the arms when the cutting blades are swung into position perpendicular to said plate, the upper ends of the arms having adjacent slotted crossbars united thereto and a bolt mounted in the slots to secure the crossbars in various positions of adjustment.

2. A cake cutter comprising a triangular plate with upturned back formed integral therewith and a handle rigidly united to the back, angle members having wings parallel to and united to the back at opposite ends thereof, cutting blades arranged in V-shape pivotally united to forwardly extending wings of the angle members and extending forwardly therefrom respectively, upwardly extending arms united to the opposite cutting blades, and a rest carried by the handle arranged to support the arms when the cutting blades are swung into position perpendicular to said plate, each angle member being adjustably united to the back by a slot in said member with a set screw engaging the back whereby lateral spacing of the rear ends of the cutting blades can be adjusted or varied to cut different sized slices as desired.

3. In a cake cutter comprising a triangular plate with upturned back formed integral therewith and a handle rigidly united to the back, angle members united to the back at opposite ends thereof, each including a rear arm or wing parallel to and slidable along the back and a forwardly extending arm or wing, a set screw and slot arranged to secure each rear arm in adjusted position upon the back, cutting blades arranged in V-shape pivotally united to the forwardly extending wings of the angle members and extending forwardly therefrom, upwardly extending arms united to the opposite cutting blades, and a rest carried by the handle to support the arms when the cutting blades are swung into position perpendicular to said plate, said set screws and slots serving to adjust the cutting blades to widen or narrow the space at the rear end thereof.

4. The combination as described in claim 3, and means to adjustably secure the upper ends of the arms to each other.

JOHN W. McDEVITT.

REFERENCES CITED

The following references are of record in the file of this patent:

UNITED STATES PATENTS

| Number | Name | Date |
|---|---|---|
| 1,020,865 | Wieber | Mar. 19, 1912 |
| 1,117,453 | Serrell | Nov. 17, 1914 |
| 1,931,388 | Ling | Oct. 17, 1933 |

FOREIGN PATENTS

| Number | Country | Date |
|---|---|---|
| 299,388 | Germany | July 11, 1917 |